Figure 1:
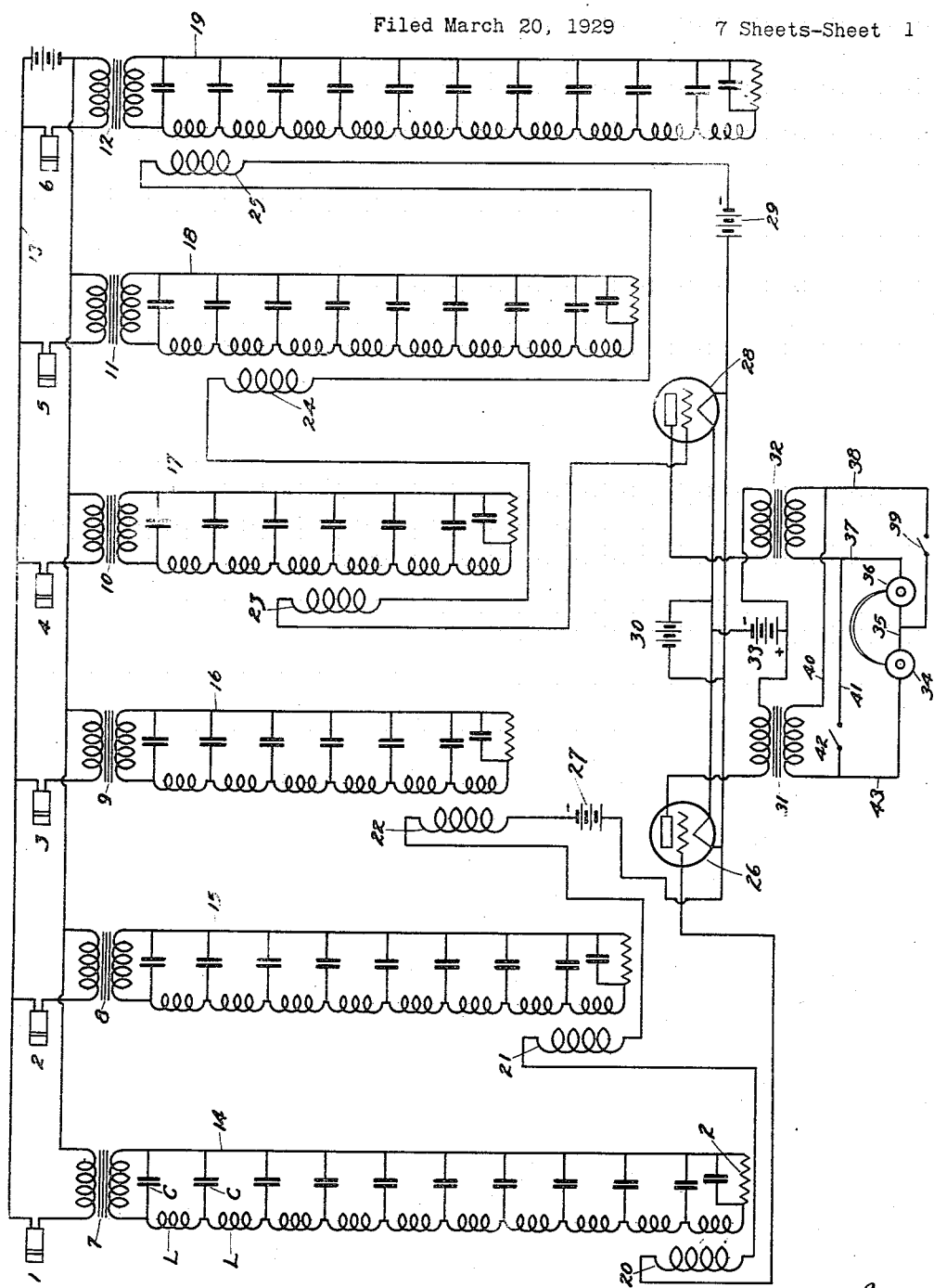

March 14, 1933.  H. W. LAMSON  1,901,342
SOUND RANGING SYSTEM
Filed March 20, 1929  7 Sheets-Sheet 1

Inventor
Horatio W. Lamson

March 14, 1933. H. W. LAMSON 1,901,342
SOUND RANGING SYSTEM
Filed March 20, 1929 7 Sheets-Sheet 4

Inventor
Horatio W. Lamson

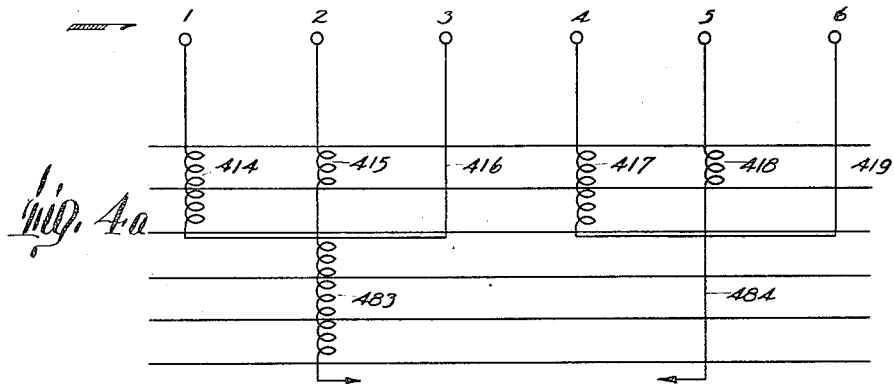
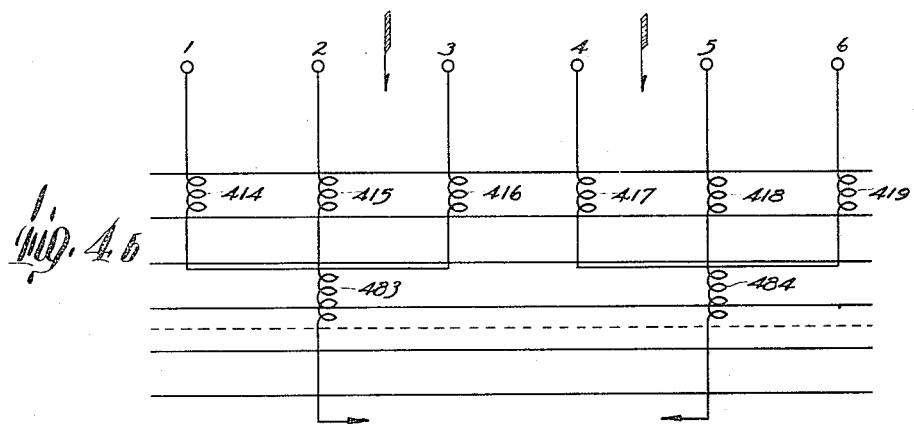
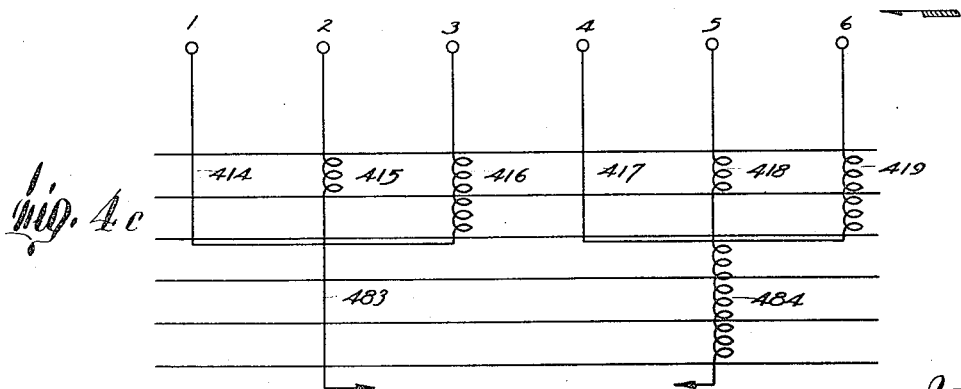

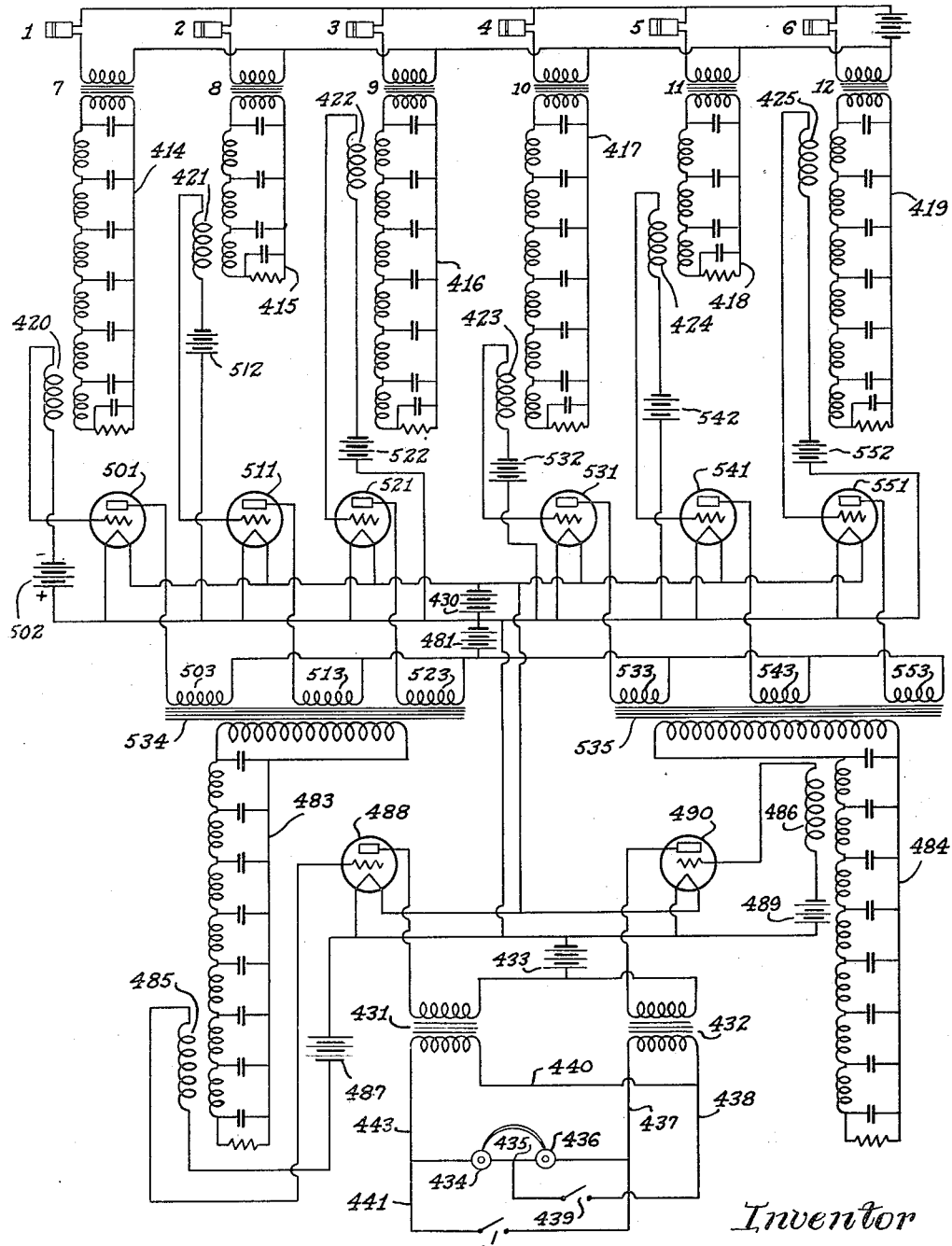

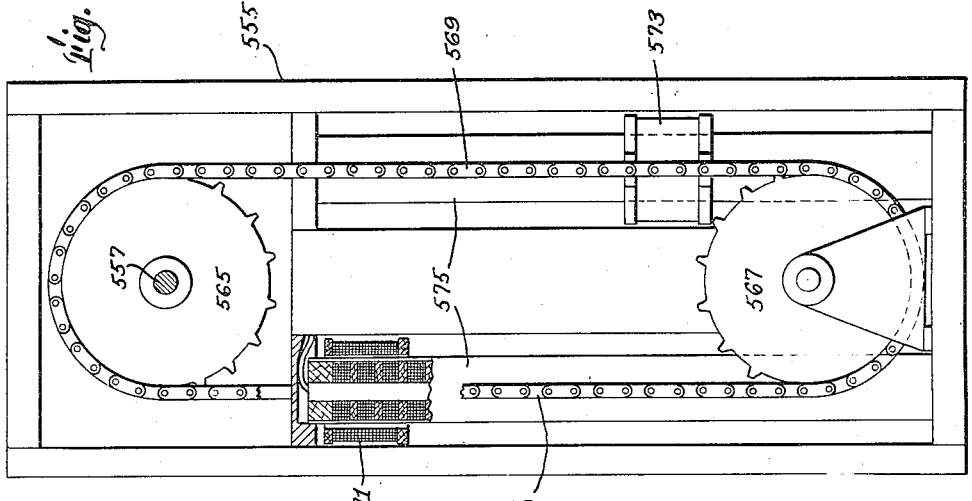
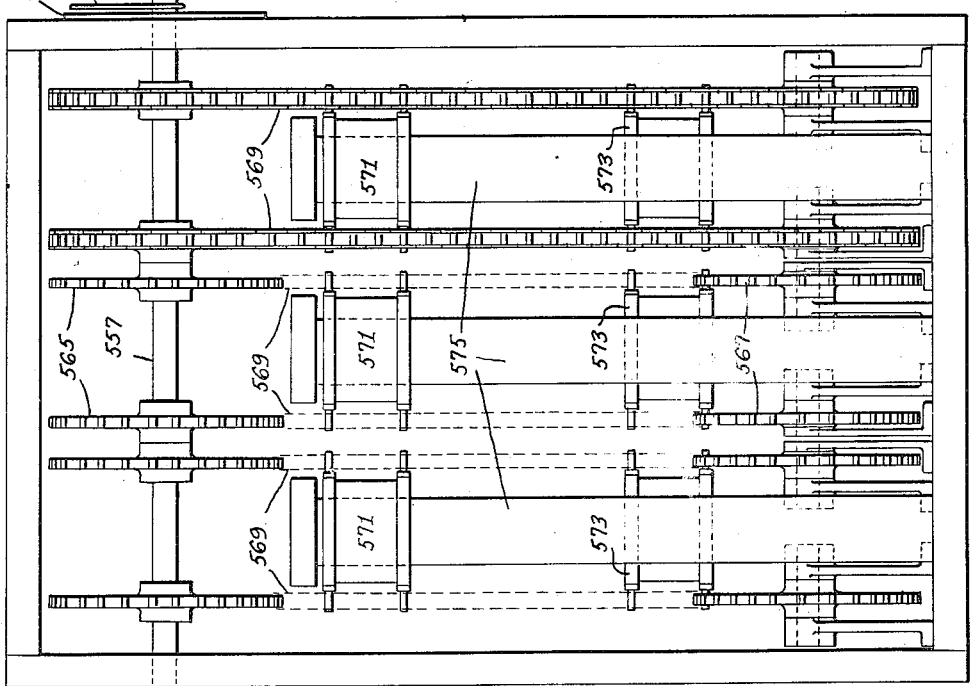

Patented Mar. 14, 1933

1,901,342

UNITED STATES PATENT OFFICE

HORATIO W. LAMSON, OF ARLINGTON, MASSACHUSETTS, ASSIGNOR TO GENERAL RADIO COMPANY, OF CAMBRIDGE, MASSACHUSETTS, A CORPORATION OF MASSACHUSETTS

SOUND RANGING SYSTEM

Application filed March 20, 1929. Serial No. 348,631.

This invention relates to systems for orientating a source of sound or, as commonly termed, sound ranging systems. In such systems use is made of the tendency of a person to turn his head toward a source of sound. This tendency for the binaural centering of sound images is accomplished by varying the length of the acoustic path between the sound source and the two ears.

Such systems have reached their highest development in the electrical type. As a rule, such an electrical system comprises two units for picking up sound and translating such sound impulses into electrical impulses. Each sound pick-up unit may consist of one or more actual pick-ups. The outputs of the units are fed into variable artificial lines. Such lines as are used in these systems have the property of retarding the impulses. The retarded impulses are then transformed into sound impulses at the ears of the observer. The tendency of the observer to binaurally center the sound images, prompts him to so adjust the relative values of the retardation lines, that in spite of the fact that impulses may arrive at the units asynchronously, nevertheless the final sound impulses in the observer's ears are synchronized.

In another application of mine, Serial No. 293,228, filed July 16, 1928, I have disclosed an improved system of this character in which each pick-up unit is fed into an individual artificial line. Artificial lines for use in such systems comprise sections of inductance connected in series with the line and units of capacity connected across the line at the junction points of the inductance units. Such retardation lines are old in the art, and may be made so that the retardation may have any desired relation to the linear advance along the line. In prior systems of this character, the only way in which the value of the retardation line could be varied was by successively connecting the system across the terminals of particular sections, while disconnecting the rest of the line. In actual practice in such systems, the line could be severed successively at the terminals of each section and the output from each end of the line fed into the telephones at the observer's station. In this way but one artificial line was used which was at all times under various instrument settings severed into two separate but complemental retardation lines.

As disclosed and claimed in my application above referred to, my system employs a retardation line the value of which may be uninterruptedly varied from a minimum to a maximum. This uninterrupted and smooth variation allows of a gradual and smooth variation of the retardation effects. In this way, readings as to direction of sound may be obtained to as fine a degree as interpolation between scale divisions will permit. This distinguishes over prior devices in which such interpolation was impossible and meaningless because of the discontinuous variations of the effective length of the retardation lines.

In general, a line whose effective retardation value may be smoothly and uninterruptedly varied over its entire length is constructed by disposing the inductive elements of the line in such relation to each other that if they are all considered as individual primaries of a transformer, then it is possible to make the secondary come into cooperative relation with any one or more of such elements. The simplest and most convenient method of doing this is to dispose the inductive elements of the retardation line end to end on a cylindrical form. A pick-up coil is then arranged so that it may slide over any portion of the inductance elements. This pick-up coil is preferably of such a length that it at all times engages at least one inductance element completely and one half of the next adjacent one. It is evident that, by gradually changing the relative position of the pick-up coil and the inductance elements of the retardation line, the effective value of the retardation line is smoothly and uninterruptedly varied with respect to the secondary coil. It is further evident that this change in relative position may be accomplished by moving the pick-up coil alone, the assembly of the inductance units alone, or both together.

In retardation lines, it is for many purposes very desirable that the retarding effect of the line change in a smooth and gradual manner, and that the impedance remain constant in order that no reflections of the current waves occur within the line. As a rule the input circuit of such a line is carefully matched with the line. The output of the line ends in a so-called terminal characteristic impedance. Such an impedance has the property of matching the impedance of the line facing it.

With the pick-up coil in inductive relation to one or more of the inductive elements of the retardation line if current were allowed to flow in the pick-up coil it would cause by reaction on the inductive elements of the line, a departure from the normal impedance properties of the line. In other words, with the pick-up coil carrying current induced in itself because of its relation with the inductive elements of the lag line, the impedance of the line would change at that particular point which would result in undesirable electrical reflections in the line. These reflections tend to make the real retardation suffered in the lines different from the calculated retardation, and hence, result in errors. Such reflections give rise also to standing wave systems which reinforce certain frequencies and attenuate others. In order therefore to eliminate any such possibilities, I make use only of the electromotive forces induced in the pick-up coil without allowing corresponding currents to flow. Preferably, I accomplish this by connecting the pick-up coil to the input side of a vacuum tube biased in such manner that practically no current can flow. Such potential amplifiers are well known in the art and consist merely of ordinary vacuum tubes with a negatively biased grid.

The system described and claimed in my application referred to above, makes use of such a smoothly adjustable retardation line in connection with a system which has only two microphones or sound pick-up devices. As a rule the microphones are equally sensitive to sound from all directions. In such a system, therefore, while it is possible to focus upon a particular source of sound as distinguished from other sources of sound, the presence of the other disturbing sounds renders this process difficult and at times detracts from the real selectivity of this system. In order to overcome this objection, I have devised systems using a plurality of pick-up units.

In general a system using a plurality of units has an even number of microphones or other sound pick-ups distributed at any predetermined intervals along a base line. Each one of these pick-ups is preferably associated with a retardation line. The relative disposition of the sound pick-up devices and the relative effective values of the retardation lines create such a condition in the entire system that when sound from the desired source is focused by the system, the sound impulses from this source add and reinforce themselves to give a maximum response while sound impulses from any other undesired source having a different orientation interfere with each other and tend to minimize the resultant composite response from the undesired source.

In order to carry this out, I have devised two distinct systems. In one there is a principal axis which is the perpendicular bisector of the base line. With the sound pick-ups distributed in a straight line at equal distances from each other, the principal axis is half way between the centre pair of pick-ups. Each pick-up on one side of the axis has its complemental pick-up on the other side of the axis. Thus the two extreme pick-ups are complemental to each other. The others are in the same relation according to the symmetry of their position with respect to the principal axis. On one side of the axis, the sound waves may be considered to be arriving in advance of the other side. Hence, the complemental pick-ups are each associated with artificial retardation lines which are complementally adjusted with regard to their effective lengths.

The other system, in addition to the principal axis, employs two minor axes on each side of which compensation is properly effected initially. These two groups of compensated outputs are then compensated with respect to each other and with reference to the principal axis.

Referring to the drawings, Figure 1 is a diagrammatic representation of a sound ranging system.

Figure 2:
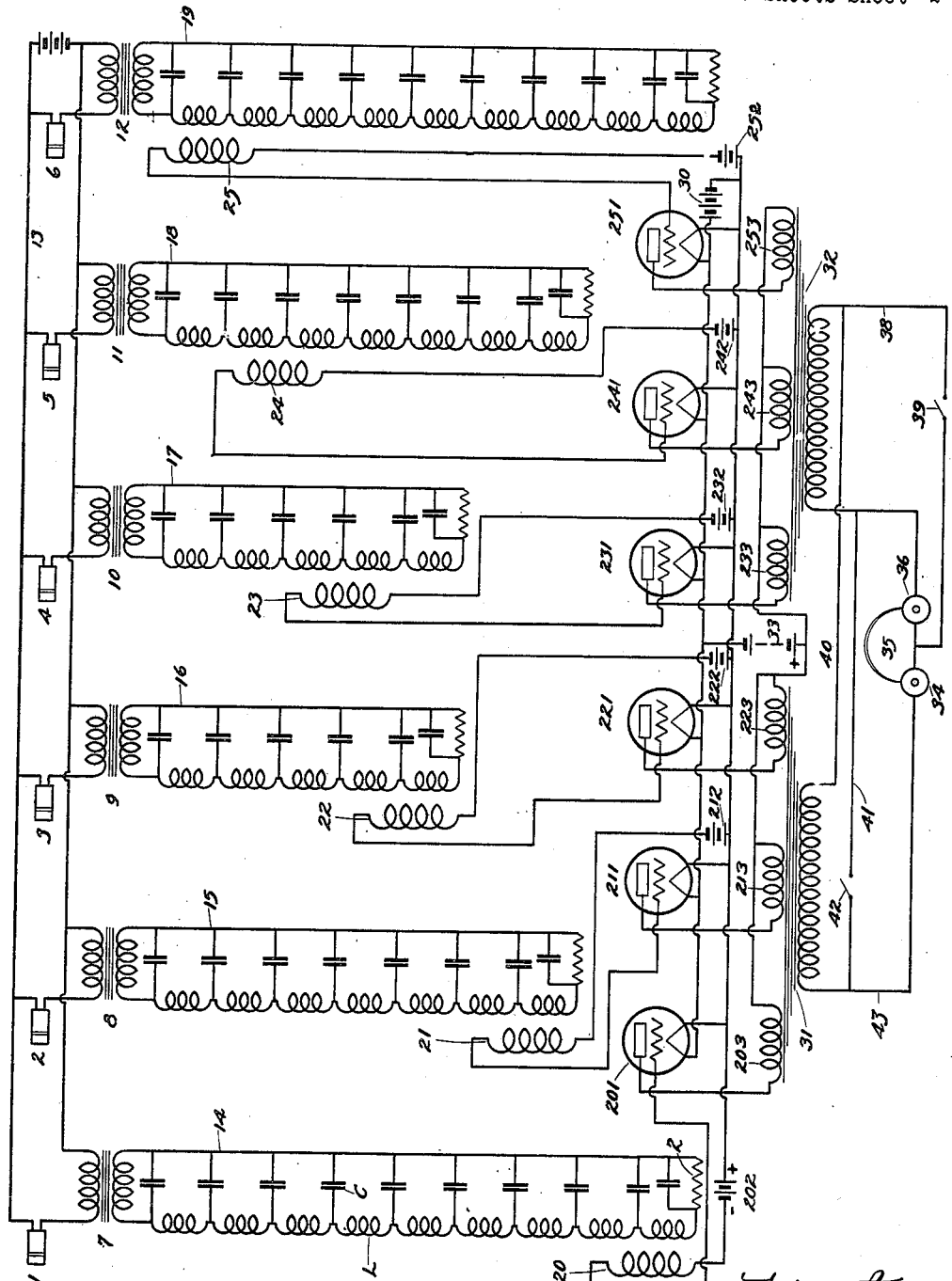

Figure 2 is a modification.

Figure 3:
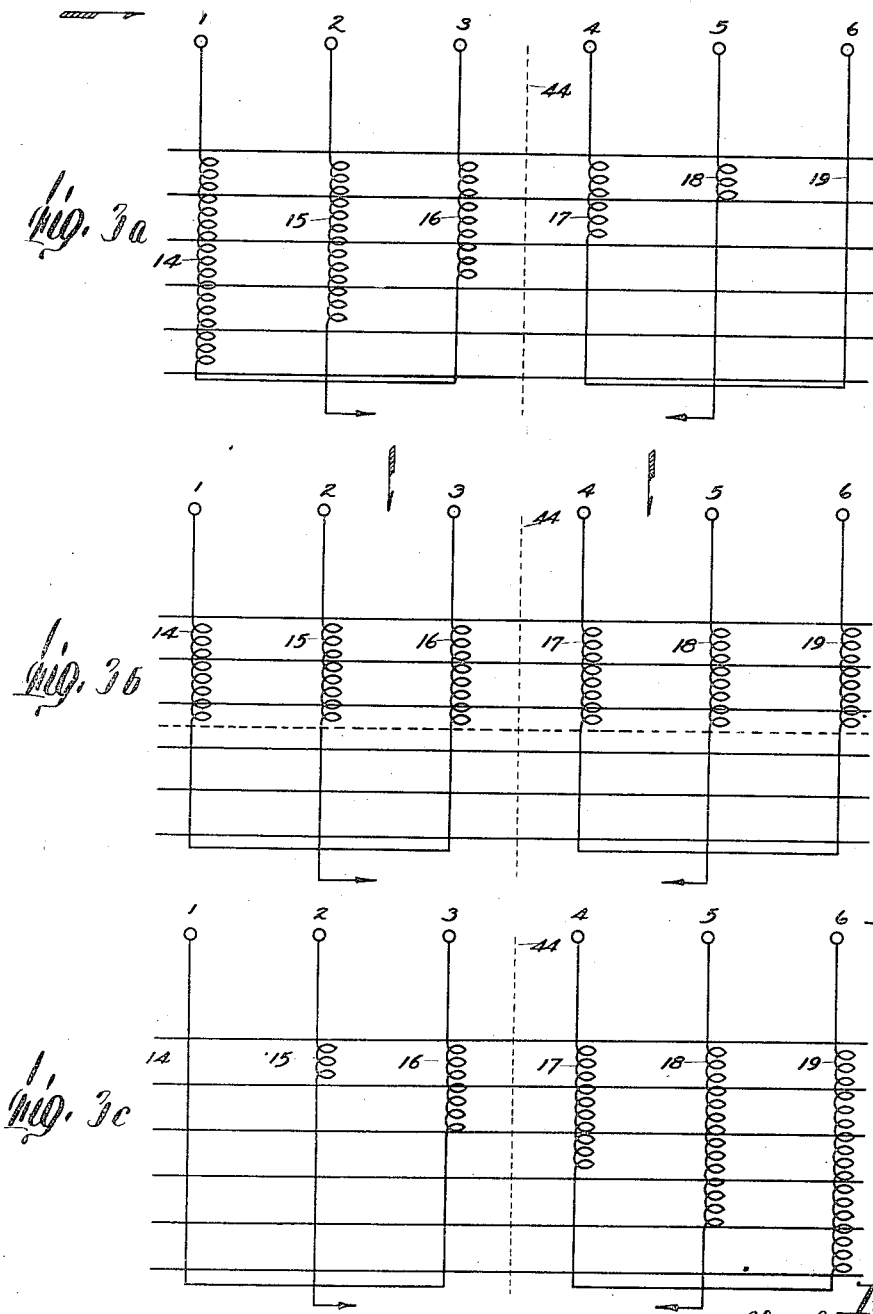

Figures 3(a), 3(b), and 3(c) are diagrams in connection with the systems shown in Figures 1 and 2 which focus directly to the principal axis.

Figure 4:
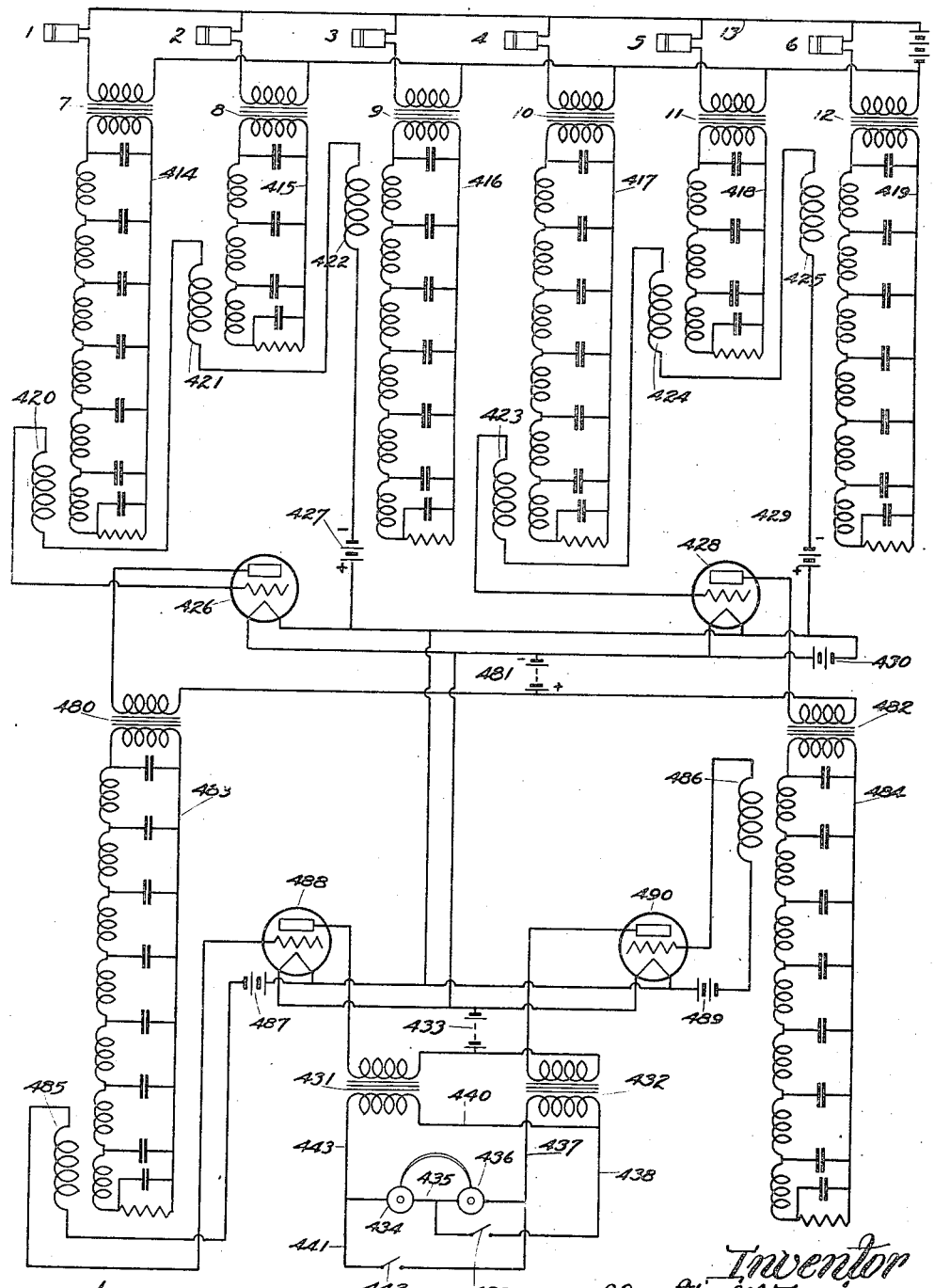

Figure 4 is a different sound ranging system.

Figures 4(a), 4(b) and 4(c) are diagrams relating to the systems shown in Figures 4 and 5, which focus first to the two minor axes and subsequently to the principal axis.

Fig. 5 is a view similar to Fig. 4 of a modification; Fig. 6 is a side elevation of apparatus constructed and arranged according to a preferred embodiment of the present invention, showing means for simultaneously moving six pick-up coils in order smoothly and uninterruptedly to vary the effective retardation of six lag lines; and Fig. 7 is a front elevation of the same.

Referring to Figure 1, the system comprises a plurality of sound pick-ups such as microphones, 1–6 inclusive. While it is not essential, it is preferable to dispose these pick-ups along a straight line at equal distances. Each pick-up is connected to the primary of one of six transformers 7–12 inclusive. Each pick-up and the primary of the corresponding transformer is bridged across a common battery circuit 13 for the purpose of energization. It is possible for each pick-up to be electrically distinct from the other and have separate energizing means. The secondaries of each of the transformers 7–12 inclusive are connected to artificial lines 14–19 inclusive.

As clearly indicated, each of these artificial retardation lines is composed of sections of inductance elements L connected in series on one side of the line and capacity elements C bridged across the junctions of the inductance elements to the other side of the line. At the end of each artificial line is a terminal characteristic impedance Z. In actual practice the inductance elements L of a single retardation line are customarily coaxially disposed in a line on a cylindrical form, establishing a predetermined mutual inductance between adjacent coils. Associated with each retardation line is a pick-up coil. Retardation lines 14–19 inclusive have their individual pick-up coils 20–25 inclusive. These coils are preferably of such a length that they at all times engage more than one complete inductance unit of each line.

Each of the pick-up coils 20–25 inclusive is capable of sliding up and down the length of the inductance elements of its retardation line. Pick-up coils 20–22 inclusive are connected in series with each other between the grid of tube 26 and the negative pole of biasing battery 27. Pick-ups coils 23–25 inclusive are similarly connected in series between the grid of tube 28 and the negative pole of a biasing battery 29. If desired, a single biasing battery may be substituted for 27 and 29. The positive poles of both batteries 27 and 29 are connected to one terminal of the filament circuit of the tubes. The filaments of both tubes 26 and 28 are connected in parallel and supplied by a common battery 30. The plates of tubes 26 and 28 are connected individually to the primaries of transformers 31 and 32. The other ends of the primaries of these transformers are connected together to the positive pole of a battery 33. The negative pole of this common plate battery 33 is connected to the filament circuit. The secondary of transformer 31 is connected by wire 43 to one terminal of a receiver 34. The other terminal of receiver 34 is connected by a wire 35 to a terminal of receiver 36. The other terminal of receiver 36 is connected by a wire 37 to the secondary of transformer 32. The other terminal of the secondary of transformer 32 is connected to wire 35 between the receivers through a wire 38 and a switch 39. Wire 40 connects one end of the secondary of transformer 31 to the other end of the secondary of transformer 32. Wire 41 and switch 42 connect wires 43 and 37.

The operation of this system is as follows:—Assume a source of sound directly in line with the sound pick-ups 1–6 inclusive and to the left thereof. Sound waves will impinge on the pick-ups in numerical order. It is obvious that, unless each pick-up is compensated for with respect to the other pick-ups, the outputs will not be in synchronism with each other. Assume, for example, that pick-ups 1–6 inclusive are in water one foot apart. In order to compensate pick-up 1 against pick-up 6, it will be necessary to retard the output of pick-up 1 by the same interval of time as it takes for sound to travel between pick-ups 1 and 6. In this particular instance, the effective length of the retardation line would have to be five water feet. The same is true of the other pick-ups in a corresponding degree. Thus, pick-up 2 will have one water foot less retardation with respect to 1. Pick-up 3 will have two water feet less retardation with respect to 1 and so on. Pick-up 6, of course, under these conditions should not have any retardation.

Considering the retarded outputs of pickups 1, 2, and 3 as one group, the impulses in pick-up coils 20, 21, and 22 will be synchronous under the conditions assumed. The same is true of impulses in coils 23, 24, and 25. With the setting shown, the impulses from the two groups of coils amplified by tubes 26 and 28 will be perfectly synchronized with each other and will indicate this in receivers 34 and 36.

Sounds coming from any other direction but the one for which the device is set will set up impulses in the system which cannot be completely synchronized with each other and whose intensity can never be at a maximum.

Figure 2 is broadly similar to Figure 1, except that pick-up coils 20–25 inclusive have individual amplifiers feeding into individual primary coils of transformers 31 and 32. Thus, pick-up coil 20 is connected between the grid of an amplifier 201 and the negative pole of a biasing battery 202. The other pick-up coils are similarly connected between the grids of corresponding tubes 211, 221, 231, 241, 251 and the negative poles of batteries 212, 222, 232, 242, and 252. If desired, a single biasing battery may be substituted for 202, 212, 222, 232, 242 and 252. The filament circuits of all the tubes are connected in parallel to a supply battery 30. The plates of tubes 201, 211, 221, and 231, 241 and 251 respectively are connected to individual primaries 203, 213, 223, and 233, 243, and 253 of the two transformers 31 and 32. The ends of all these primaries are connected to the positive pole of a B battery 33, the negative pole being connected to the filament circuit.

Fundamentally the system shown in Figure 2 operates in a similar manner to that of Figure 1. The impulses from the various pick-up coils suitably retarded with respect to each other are individually amplified and have their output currents fed into individual primaries of a pair of transformers 31 and 32. Whereas in Figure 1 the synchronized impulses of one group of coils were allowed to combine in series in the vacuum tube input circuit, in Figure 2 the corresponding group of impulses is amplified individually and is then allowed to combine in the magnetic portion of transformers 31 and 32.

In order to clearly understand the operation of the systems shown in Figures 1 and 2, reference will now be made to Figures 3(a), 3(b) and 3(c). In Figure 3(a), the system is shown as adjusted for sound coming from the extreme left directly in line with pick-ups 1–6 inclusive. As previously pointed out, in order for the final outputs from the two groups of secondaries to be binaurally centered, it is necessary that line 14 have an effective value of five water feet, line 15 have an effective value of four water feet, line 16—three water feet, line 17—two water feet, line 18—one water foot and line 19—0 water feet, assuming of course that pick-ups 1–6 inclusive are in water one foot apart. It is obvious that a constant value of line may be added on to all providing the net differences remain as above. In Figure 3(b), the system is shown as set up for sound coming directly in front of it. From this direction there is no necessity for any differential retardation in the value of the lag lines. Under these conditions it is immaterial what the actual retardation in each line is if all the lines have equal values. In this diagram the lines are shown as having equal values of 2½ water feet. In Figure 3(c), the sound is coming from the extreme right in line with the pick-ups. The relative values of the lines will be exactly opposite to the set up in Figure 3(a).

In order to determine the rate of variation of effective values of the lag lines, let us assume a principal axis 44, shown in dotted lines perpendicular to the pick-up base line and half way between the two groups. From whichever direction sound may come, with respect to the intersection of the principal axis and the base line, the pick-ups fall into three complementary groups. Thus pick-ups 3 and 4 are synchronously complementary in the sense that pick-up 3 will receive its impulses exactly at same amount of time ahead or behind the principal axis as pick-up 4 will receive it behind or ahead. If one is ahead, the other is behind, but the interval is the same with respect to the axis. The same is true of pick-ups 2 and 5 as one group and pick-ups 1 and 6 as another group. Therefore, retardation lines 14 and 19 must each have a variable effective length of at least five water feet in order to range sound from all directions. Pick-ups 2 and 5 each require effective length of four water feet relative to a five water foot value of lines 14 and 19. Pick-ups 3 and 4 each require an effective length of three water feet. As is obvious from Figures 3(a) and 3(c), the maximum retardation in lines 14, 15 and 16 is necessary with sound coming from the left, while the maximum retardation in lines 17, 18 and 19 is required when sound is coming from the right. Hence, it is evident that at least 24 water feet of lag lines are necessary.

In order to adjust the system for any intermediate setting corresponding to a direction between the extreme right and extreme left, it is necessary to adjust the value of each of the retardation lines. Since pick-ups 3 and 4 are equidistant from the principal axis, but on opposite sides, whatever change is necessary in the value of one line is exactly equal and opposite to the change necessary in the other line. However, lines 15 and 18, being one and a half feet away on each side of the axis, require three times the change necessary in lines 16 and 17 which are one-half a foot from the axis. Lines 14 and 19 being 2½ feet away from the principal axis, require five times as much of a variation to compensate for the lag as is true of lines 16 and 17. It therefore follows that from one extreme position as in 3(a), where the entire five feet of line 14 is effective to the other position in 3(c) where no portion of the line 14 is effective, the variation must be exactly five times as fast as the variation in line 16 which only changes one water foot between the two extreme positions. From this it is clear that the ratio of the variation of effective lengths of lines 14–19 inclusive is 5:3:1:1:3:5.

In order to obtain this variation, one of two things is possible. Thus, it is possible to move all the pick-up coils 20–25 inclusive at equal rates, but the first three opposite in direction to the last three. If this is done, it is necessary that the rate of change of effective value of lag line per unit of linear length be five times as great in lines 14 and 19 as is true in lines 16 and 17. Obviously the corresponding ratio for lines 15 and 18 with respect to lines 16 and 17 is 3:1. Thus, while the rate of travel of pick-up coils along the lag lines is the same for all of them, the rate of change of effective value of the lag line would be different for the three lines on each side of the principal axis.

If it is desired to use uniform lag lines of constant lag per unit of linear length, suitable mechanism may be so arranged that pairs of pick-up coils 20 and 25; 21 and 24;

and 22 and 23, move at equal rates of speed and in opposite directions to each other. However, the length of travel of coils 20 and 25 will be five times the length of travel of coils 22 and 23. Obviously coils 21 and 24 will travel three times the distance coils 22 and 23 travel. It is possible to design suitable mechanism using gears of suitable relative diameters, so that the pairs of coils may be suitably actuated to travel at the desired relative speeds and distances.

Referring to Figure 4, the system disclosed therein has the six sound pick-ups, 1 to 6 inclusive, each connected to the primaries of transformers 7 to 12 inclusive, all the pick-up circuits being connected to a common battery energizing circuit 13. Transformers 7 to 12 inclusive are coupled to individual retardation lines 414 to 419 inclusive. These lines are similar to the lines in the systems illustrated in Figures 1 and 2. Each of the retardation lines has associated therewith, a movable pick-up coil 420 to 425 inclusive. The first three pick-up coils 420–422 inclusive are connected in series between the negative pole of a biasing battery 427 and the grid of an amplifier 426. The other three pick-up coils 423–425 inclusive are also connected in series between the grid of a vacuum tube amplifier 428 and the negative pole of the battery 429. A common biasing battery may be substituted for 427 and 429, if desired. The filaments of tubes 426 and 428 are energized by a common battery 430. The positive poles of grid bias batteries 427 and 429 are connected in the usual manner to the filaments. The plate of tube 426 is connected through the primary of a transformer 480 to the positive pole of a battery 481. The negative pole of this battery is connected to the filament circuit. The plate of tube 428 is similarly connected through the primary of a transformer 482 to the positive plate of the same battery 481. Transformers 480 and 482 are each associated with individual retardation lines 483 and 484. These retardation lines are similar to the lines described above.

Each line has associated therewith, a movable pick-up coil 485 and 486. Pick-up coil 485 is connected between the bias battery 487 and the grid of a tube 488. In a similar manner pick-up coil 486 is connected between the bias battery 489 and the grid of a tube 490. A common biasing battery may be substituted for 487 and 489 if desired. The filament circuits of tubes 488 and 490 are connected together to battery 430 for energization. The plate of tube 488 is connected through the primary of a transformer 431 to the positive pole of a battery 433. The plate of the other tube 490 is similarly connected to a primary transformer 432 through battery 433. The negative pole of this battery is suitably connected to the filament circuit. If desired, a single plate circuit battery may be substituted for 433 and 481. The ends of the secondaries of transformers 431 and 432 are connected by a wire 440. The other end of the secondary of transformer 431 is connected by wire 443 to a telephone receiver 434. Wire 435 connects receiver 434 to receiver 436. The free end of receiver 436 is then connected by a wire 437 to the free end of transformer secondary 432. A wire 438 with a switch 439 connects the wire 435 with wire 440. Wire 441 and switch 442 connect wires 443 and 437 together.

The operation of this system is as follows:

Assume a sound travelling in line with the base line of the pick-ups and coming from the left. Sound will strike the pick-ups in numerical order. Assume that pick-up coils 421 and 424 are adjusted to a fixed position such that the effective retardation of lag lines 415 and 418 shall be equal and each equal to or greater than the maximum retardation possible between any two adjacent pickups. Considering their corresponding sound pick-ups 2 and 5, each of these may be considered as at a minor or pivotal axis with respect to their adjacent pick-ups. Thus pick-up 2 is synchronously intermediate pick-ups 1 and 3. In fact, in from whatever direction sound comes, pick-up 2 will always be energized at a time equi-distant from the times of pick-ups 1 and 3. Hence by fixing the retardation associated with pick-up 2, it is possible to adjust the lag for pick-ups 1 and 3 so that their outputs will be synchronized with pick-up 2 with respect to a particular sound source. Precisely the same is true of the other half of this portion of the system comprising pick-ups 4, 5, and 6 and their associated lines. Thus this portion of the system may be considered to have the pivotal pick-up 5 with the associated balanced lines on each side of this pick-up. This will give a maximum response at each of the two pivotal points.

To binaurally center the sound image it will now be necessary to further balance the two pivotal points with respect to each other. In other words, with the outputs of the pick-ups 1 and 3 and the pick-ups 4 and 6 balanced synchronously around the output of pick-ups 2 and 5 as the pivotal points, it is necessary to now balance each group against the other for perfect binaural setting. In order to do this, each group of three pick-up coils 420, 421 and 422 as one group, and 423, 424, and 425 as the other group, have their impulses amplified respectively in tubes 426 and 428. The outputs of each of these tubes are fed through the transformers into the retardation lines 483 and 484. With the sound coming from the extreme left as assumed, pick-up coil 485 will be in a position of maximum retardation while coil 486 will be in a position of minimum retardation. In this way the impulses from each group of three above, after having been synchronized between themselves are now synchronized against each other. The final impulses from amplifiers 488 and 490 appear in receivers 434 and 436 as binaurally centered impulses having a maximum intensity.

Referring to Figures 4(a), 4(b) and 4(c), the settings of the apparatus for sounds coming from three directions are indicated. In Figure 4(a) the sound is assumed to be coming from the extreme left directly in line with the base line of pick-ups 1 to 6 inclusive. Again as in the previously described systems, pick-ups 1 to 6 inclusive will be assumed to be disposed in water a foot apart. Assume that retardation lines 415 and 418 are adjusted for exactly one water foot. It is evident, therefore, that in order to have the outputs of the three lines 414 to 416 inclusive synchronous, it is necessary to retard the output of pickup 1 by two water feet and to have no retardation whatever on the output of pick-up 3. In other words, with pick-up 2 as a pivot, it is necessary to have just as much more compensation on the left as is dispensed with on the right. The same is true with respect to the outputs of 4 to 6 inclusive.

The synchronized outputs of the first 3 pick-ups will not be synchronized with the synchronized output of the second 3 pick-ups.

Since pick-ups 2 and 5 are the pivotal pick-ups around which the adjacent pick-ups are synchronized, the impulses in the first group of pick-ups when properly synchronized will be exactly three water feet ahead of the impulses from the second group when perfectly synchronized. This follows when it is considered that the distance between pick-ups 2 and 5 is 3 water feet. In order to compensate one group against the other, it will, therefore, be necessary to introduce a retardation effect equivalent to 3 water feet in line 483 as against no retardation whatever in line 484. Under these circumstances final impulses will be perfectly synchronized and the images thus binaurally centered.

In Figure 4(b) the sound is assumed to be coming from a direction perpendicular to the base line. Since retardation lines 415 and 418 are fixed at one water foot, the remaining lines 414, 416, 417 and 419 will also have to be adjusted to the same value since no net compensation between the various lines is now permissible. While no effective value at lines 483 and 484 is essential, from the manner in which the pick-up coils 485 and 486 are moved, one moving in one direction and the other moving in the other direction, the effective values of these two lines meet at one and a half water feet. Since the two values are the same, there is no net compensatory retardation and hence the final impulses will be just as much binaurally centered as if all the outputs from pick-ups 1 to 6 had been fed directly into the receivers.

In Figure 4(c), the sound is assumed to be coming from the right in line with the receivers. The set up of the system in this case is precisely the reverse of that shown in Figure 4(a).

From one extreme as shown in Figure 4(a) to the other extreme as shown in Figure 4(c), the range of variation of lines 414, 416, 417 and 419 is 2 water feet. The maximum range of variation of lines 483 and 484 is three water feet. Considering the fixed lines 415 and 418 as pivots or balance points and values of 414, 416, 417 and 419 swing around these at equal rates. Hence pick-up coils 420 and 423 associated with lines 414 and 417 may be moved together at precisely the same speed and in the same direction. Pick-up coils 422 and 425 associated with lines 416 and 419 may also be moved together at the same speed as coils 420 and 423, but in a direction opposite thereto. By this is meant that while lines 414 and 417 are being decreased in effective value, lines 416 and 419 are being increased. It is, of course, possible to reverse the connections of the lines so that the pick-up coils may be actually travelling in the same direction but having reverse effects.

While these two groups of two pick-up coils are thus travelling at equal speeds but in opposite directions with respect to the effect on the lag lines, it is necessary to adjust lines 483 and 484 against each other at the same time. Coils 485 and 486 associated with lines 483 and 484 respectively, travel at equal speeds but have opposite effects on their respective lines. With respect to lines 483 and 484, there is a principal axis half way between pick-ups 3 and 4. Thus it will be seen that each of pick-ups 2 and 5 are one and a half water feet away from this principal axis. Hence, while pick-ups 1 and 3 are adjusted one water foot from pivotal pick-up 2, it is necessary to adjust line 483 one and one half water feet with respect to the pricipal axis between pick-ups 3 and 4. The same is true of line 484. Hence it follows that lines 483 and 484 must be varied at a rate and over a range one and a half times that of lines 414, 416, 417 and 419.

In the system of Figure 4 from the extreme positions shown in Figures 4(a) and 4(c), at least two water feet of retardation are necessary in line 414, one in line 415, two in line 416, two in line 417, one in 418, two in 419 and three each in 483 and 484. In other words, in order to have the entire system operate over the entire range of sound from extreme left to extreme right, it is necessary to have at least 16 water feet of artificial line in the entire system. This is considerably less than the 24 water feet minimum in systems of Figures 1 and 2. Hence, the system in Figure 4 is much more economical of artificial line while productive of equally satisfactory results. Equal value of line may be added to all the lines if desired, without disturbing their relative effects.

It is obvious that the lines 414 to 419 inclusive of the system shown in Figure 4 may have six individual amplifiers 501, 511, 521, 531, 541 and 551, in a manner similar to that shown in Figure 2, as illustrated in Fig. 5. Individual primary coils 503, 513 and 523 of a transformer 534 are individually inserted in the plate circuits of the amplifiers 501, 511 and 521, respectively. The same is true of the primary coils 533, 543 and 553 of the transformer 535, which are individually inserted in the plate circuits of the amplifiers 531, 541 and 551. In other respects, Fig. 5 will be understood without further description, being a modification of the system shown in Fig. 4 in a manner analogous to the modification of the system shown in Fig. 1 by the system shown in Fig. 2.

The purpose of the switches associated with the final translating circuits to the receivers in all the systems will now be disclosed. Referring to Figure 1, when the system is to be used for orientating a source of sound, switch 39 is closed and 42 is open. With the switches disposed in this manner, the secondaries of transformers 31 and 32 each have individual receivers 34 and 36 having one common junction connected by wire 35. Therefore, any impulses from the secondaries of transformers 31 and 32 will be transmitted to their individual receivers and if such impulses to the individual receivers are not synchronous, then the sounds in receivers 34 and 36 will not be synchronous, and the resultant sound image will appear binaurally off center to the observer.

The same thing is true in the system of Figures 2, 4 and 5. When the observer has been listening in this manner for some time, it is possible that he may become binaurally fatigued and desire a perfectly centered sound to use as a reference point. In such a case, switch 42 is closed, switch 39 remaining closed, bringing wires 43 and 37 to the same potential at all times. When this happens, the secondaries of transformers 31 and 32 are connected in parallel and both fed through receivers 34 and 36 connected in parallel. The result will be that whatever time difference or lack of synchronism there may have been in the impulses in the two secondaries of transformers 31 and 32 will be eliminated because both receivers 34 and 36 must now receive the impulses simultaneously. In other words, one combined impulse will now go simultaneously through both receivers, whereas before, two separate impulses went individually through two receivers. In this way it is possible to arbitrarily obtain a binaurally centered image regardless of the adjustment of the retardation lines in order that an observer may have a psychological reference point in case he becomes fatigued. The same applies to the systems in Figures 2 and 4.

If, when the system is completely balanced to give synchronous responses in the receivers 34 and 36, both switches 42 and 39 are opened, then no response will be heard in the phones because the output potentials developed in the secondaries of transformers 31 and 32 are opposed in polarity across receivers 34 and 36 joined in series. As these potentials are supposedly synchronous and equal in magnitude, the resultant potential and hence the response in the receivers will be nil. This arrangement, which applies to the systems disclosed in Figures 1, 2, 4 and 5, might be useful in ranging sound sources of good intensity, but it is especially useful in adjusting and balancing the various amplifier units involved.

While it is possible, and in fact desirable, that all the movable pick-up coils in all the systems be simultaneously actuated at their respective speeds, this is by no means necessary. Thus in the systems shown in Figures 1, and 2, it is possible to have the coils associated with the sound pick-ups 1 to 3 inclusive as one unit, and the remaining three coils as another unit. Binaural centering of the image would then be accomplished by simultaneously actuating the two sets of coils. In the case of Figs. 4 and 5, it is possible to simultaneously operate the pick-up coils associated with the sound pick-ups 1, 3, 4 and 6 as one group and then operate the pick-up coils associated with lines 483 and 484 as the other group. This would differentiate between the setting for maximum intensity and the setting for binaural balance. It is also possible to simultaneously move coils for pick-ups 1 and 3 and for lines 483 as one group and the remaining movable coils for the other group. In fact, it is also possible to move the coils for pick-ups 1 and 3 for one group and the coils for pick-ups 4 and 6 as another group and finally the coils associated with lines 483 and 484 as a third group.

The only necessity for making lines 415 and 418 associated with the sound pick-ups 2 and 5 of the system of Figure 4 adjustable is to adjust the effective value of the lines for each system. The adjustability of this line need not be over the entire range and may indeed be restricted to just such a range as will insure a proper effective line for each system as built. Some adjustment is, of course, desirable since it is difficult to make the two systems so identical that precisely predetermined amounts of line will be satisfactory.

Referring to Figs. 6 and 7, which show a preferred form of my invention, a frame 555 carries a shaft 557 which, in turn, carries a pointer 559, moving over a fixed circular scale 561. The pointer 559 may be moved over the scale 561 by rotating the shaft 557 by means of the handwheel 563. The shaft 557 carries also six sprockets 565. On the bottom of the frame are mounted six individual sprockets 567. Between each pair of upper and lower sprockets is stretched a continuous chain 569, the tension on which may be adjusted by manipulating the individual bearings for the sprockets 567. Between two adjacent chains 569 are mounted two movable pick-up coil assemblies 571 and 573, in such a manner that as the shaft 557 is rotated, the coils 571 move vertically upwards, while the coils 573 move vertically downward, or vice versa, the linear displacement being proportional to the movement of the shaft 557 and the corresponding sprocket diameters. Each of the six pick-up coil assemblies 571 and 573 slides concentrically upon a suitable individual cylindrical form 575, which encases the series of inductive elements comprising a particular lag line. The lag line units are mounted coaxially within the cylindrical case and are spaced a desired distance apart.

If the diameters of all sprockets are equal, the linear displacement of all the pick-up coils will be equal and, as pointed out elsewhere in this specification, the effective retardation per unit physical length of the several lines will be made of suitable different values. If, on the other hand, a uniform retardation per unit physical length of the lag lines is desired, the necessary different rates of travel for different pairs of coils 571 and 573 may be accomplished by a proportionate variation in the diameters of the sets of four driving sprockets 565 and 567.

Further details regarding the construction of uninterruptedly varying lag lines of this sort are shown in the said copending application, Serial No. 293,228, filed July 16, 1928.

Although preferably the lag lines are constructed linear in form, the invention is no wise restricted to this. As pointed out in the application above referred to, the line may be built in any manner whatever, as for example, by disposing the inductance units in a curvilinear manner to form a toroidal structure or may be arranged radially as with the poles of a generator.

It is entirely feasible and under certain conditions desirable, to so proportion the electrical constants of succeeding sections of any or all of the retardation lines that the change of the effective retardation is no longer a simple linear function of the physical displacement of the pick-up coil, but may be made to vary in any predetermined non-linear relation thereto.

The necessary relative displacement between the pick-up coils and inductance units of the retardation lines may be accomplished by moving the pick-up coils, by moving the retardation line assemblies, or by moving both with respect to each other.

Although I have disclosed systems having six linearly spaced pick-ups, my invention is in no wise to be limited thereto. As many pick-ups as may be desirable may be used, and these may be disposed in any manner whatsoever with respect to each other, as for instance on the periphery of a circle or an ellipse.

The system disclosed may not only be used to orientate a source of sound in the presence of other disturbing sounds in water, but also may be similarly used in air or on the ground. In each case it is evident that the spacing between the pick-ups will be determined by the nature and frequency of the sounds to be picked up and the medium in which such sound waves travel. All these are matters which will readily occur to one skilled in the art.

Although I have disclosed my multiple unit lag lines in conjunction with a sound ranging system, its field of utility is in no way to be circumscribed thereby. Another field to which my invention may be applied is in radio direction finders or radio ranging systems. It is obviously possible to replace the spaced pick-ups by spaced radio receiving systems.

Other applications of this method of uninterruptedly varying the retardations introduced into the paths of a plurality of electrical impulses will occur to those skilled in the art, all of which are within the scope of my invention.

Systems of this character as actually made up must be adjusted with reference to an arbitrary sound direction in order to properly balance up the lines and vacuum tubes against each other. In order to do this, it is preferable to have incoming impulses into transformers 7–12 inclusive all synchronous. In other words, a direction of sound at right angles to the base line, if straight, is to be assumed. This is preferably done by connecting the primaries of transformers 7–12 inclusive together in parallel and having sound impulses from any one of the microphones actuate it. Under these conditions, electrical waves will start out simultaneously from the input ends of lag lines 14–19 inclusive.

By having such impulses synchronous at the input ends of the lines and by listening to the telephone receivers at the same time, it is possible to calibrate the system so that the artificial lines are balanced against each other and the various vacuum tubes are balanced against each other. With regard to the latter, although in theory it is necessary to have tubes of identical characteristics, in practice this is almost impossible to obtain. However, tubes of differing characteristics may be effectively used by operating them in such a manner that the resultant amplification is identical for all the tubes. To obtain this, it is possible to vary any one or more of the three conveniently adjustable tube factors, namely, filament temperature, grid bias, and plate potential.

I claim:

1. An electric system having, in combination, two units for independently picking up sound impulses and for translating them into electrical impulses, each unit comprising a plurality of sound-pick-up devices, a lag line associated with each pick-up device, means inductively associated with each lag line for picking up voltage impulses from the corresponding lag line for uninterruptedly varying the effective value of the corresponding lag line in order gradually and smoothly to retard the voltage impulses picked up from the corresponding lag line, a plurality of vacuum tubes, one for each pick-up device, and each having an input circuit and an output circuit, means for biasing the vacuum tubes to keep the current flow in the input circuits at a negligible value, means for connecting the inductively associated means individually in the corresponding input circuits, means including two transformers each having a primary winding in each of the output circuits and a secondary winding, phase-indicating means, and means connecting the latter to the two secondary windings.

2. An electric system having, in combination, two units for independently picking up sound impulses and for translating them into electrical impulses, each unit comprising a plurality of sound pick-up devices, a lag line associated with each pick-up device, means for retarding the electrical impulses picked up from the lag lines, a plurality of vacuum tubes, one for each pick-up device, and each having an input circuit and an output circuit, means for biasing the vacuum tubes to keep the current flow in the input circuits at a negligible value, means for connecting the lag lines individually with the corresponding input circuits, two circuits respectively connecting together the output circuits corresponding to each unit, a lag line associated with each connecting circuit, means for retarding the electrical impulses in each of the last-named lag lines, a vacuum tube for each of the last-named lag lines and having an input circuit and an output circuit, means for connecting each last-named lag line with the corresponding last-named input circuit, means including two transformers each having a primary winding in each of the last-named output circuits and a secondary winding, phase-indicating means, and means connecting the latter to the secondary windings.

3. An electric system having, in combination, two units each having a plurality of individual lag lines, means for obtaining electrical currents in each lag line, each lag line having a plurality of inductor coils, a pick-up coil for each lag line adapted to be moved relatively to the inductor coils of the corresponding lag line, whereby adjacently disposed inductor coils of each lag line serve successively as primary coils and the corresponding pick-up coil serves as the secondary coil of a transformer to cause each pick-up coil to pick up voltage impulses from its corresponding lag line, means for continuously moving relatively the inductor coils and the corresponding pick-up coil to vary uninterruptedly the effective values of the lag lines in order gradually and smoothly to retard the voltage impulses picked up from the corresponding lag lines, each lag line having a terminal characteristic impedance for maintaining the impedance of the corresponding lag line constant in order to prevent reflections of current waves within the lag lines, a plurality of vacuum tubes each having an input circuit and an output circuit, means for biasing the vacuum tubes to keep the current flow in the input circuits at a negligible value, and means for connecting corresponding pick-up coils with corresponding input circuits, means including two transformers each having a primary winding in each of the output circuits and a secondary winding, phase-indicating means, and means connecting the latter to the two secondary windings.

4. An electric system having, in combination, two units each having a plurality of individual lag lines, means for obtaining electrical currents in each lag line, means inductively associated with each lag line for picking up voltage impulses from the corresponding lag line for uninterruptedly varying the effective value of the corresponding lag line in order gradually and smoothly to retard the voltage impulses picked up from the corresponding lag line, a plurality of vacuum tubes, one for each pick-up device, and each having an input circuit and an output circuit, means for biasing the vacuum tubes to keep the current flow in the input circuits at a negligible value, means for connecting the inductively associated means individually in the corresponding input circuits, means including two transformers each having a primary winding in each of the output circuits and a secondary winding, phase-indicating means, and means connecting the latter to the two secondary windings.

5. An electric system having, in combination, two units each having a plurality of individual lag lines, means for obtaining electrical currents in each lag line, means for retarding the electrical impulses picked up from the lag lines, a plurality of vacuum tubes, one for each lag line, and each having an input circuit and an output circuit, means for biasing the vacuum tubes to keep the current flow in the input circuits at a negligible value, means for connecting the lag lines individually with the corresponding input circuits, two circuits respectively connecting together the output circuits corresponding to each unit, a lag line associated with each connecting circuit, means for retarding the electrical impulses in each of the last-named lag lines, a vacuum tube for each of the last-named lag lines and having an input circuit and an output circuit, means for connecting each last-named lag line with the corresponding last-named input circuit, means including two transformers each having a primary winding in each of the last-named output circuits and a secondary winding, phase-indicating means, and means connecting the latter to the two secondary windings.

In testimony whereof, I have signed my name to this specification this 14th day of March, 1929.

HORATIO W. LAMSON.